United States Patent
Brunner

(10) Patent No.: US 9,302,335 B2
(45) Date of Patent: Apr. 5, 2016

(54) METHOD FOR PRODUCING A TUBE FOR A HEAT EXCHANGER, IN PARTICULAR FOR A MOTOR VEHICLE

(75) Inventor: Steffen Brunner, Weissach im Tal (DE)

(73) Assignee: MAHLE INTERNATIONAL GMBH, Stuttgart (DE)

(*) Notice: Subject to any disclaimer, the term of this patent is extended or adjusted under 35 U.S.C. 154(b) by 120 days.

(21) Appl. No.: 13/808,275

(22) PCT Filed: Jul. 6, 2011

(86) PCT No.: PCT/EP2011/061376
§ 371 (c)(1),
(2), (4) Date: Jan. 4, 2013

(87) PCT Pub. No.: WO2012/004290
PCT Pub. Date: Jan. 12, 2012

(65) Prior Publication Data
US 2013/0097864 A1    Apr. 25, 2013

(30) Foreign Application Priority Data
Jul. 6, 2010    (DE) .......................... 10 2010 026 280

(51) Int. Cl.
B23P 15/26    (2006.01)
B23D 21/14    (2006.01)
B21D 53/06    (2006.01)

(52) U.S. Cl.
CPC ............... B23D 21/14 (2013.01); B21D 53/06 (2013.01); *Y10T 29/49391* (2015.01); *Y10T 83/0524* (2015.04); *Y10T 83/0596* (2015.04)

(58) Field of Classification Search
USPC .................. 29/890.03, 890.053; 83/169, 188; 225/103
See application file for complete search history.

(56) References Cited

U.S. PATENT DOCUMENTS

| 2,444,465 A | 7/1948 | Peters |
| 2,997,904 A | 8/1961 | Gotsch et al. |
| 3,567,088 A * | 3/1971 | Andersen ...................... 225/103 |

(Continued)

FOREIGN PATENT DOCUMENTS

| CN | 1111748 A | 11/1995 |
| CN | 1160845 A | 10/1997 |

(Continued)

OTHER PUBLICATIONS

International Search Report, PCT/EP2011/061376, Sep. 23, 2011, 2 pgs.

(Continued)

*Primary Examiner* — Richard Chang
(74) *Attorney, Agent, or Firm* — Paul D. Strain, Esq.; Strain & Strain PLLC

(57) ABSTRACT

The invention relates to a method for producing a tube for a heat exchanger, in particular for a motor vehicle, in which a long tube, which is provided with turbulence inserts on the surface thereof, is separated into at least two individual tubes. In order to further reduce the production costs and nevertheless achieve a clean cutting surface, a first part of an at least two-part cutting device is introduced into the interior of the long tube through at least one opening of the long tube and the second part of the cutting device is placed against the outer face of the long tube approximately opposite of the inner, first part of the cutting device, wherein the first part and the second part of the cutting device are pressed against one another in order to dividing the long tube.

9 Claims, 2 Drawing Sheets

(56) References Cited

U.S. PATENT DOCUMENTS

Figure 1:
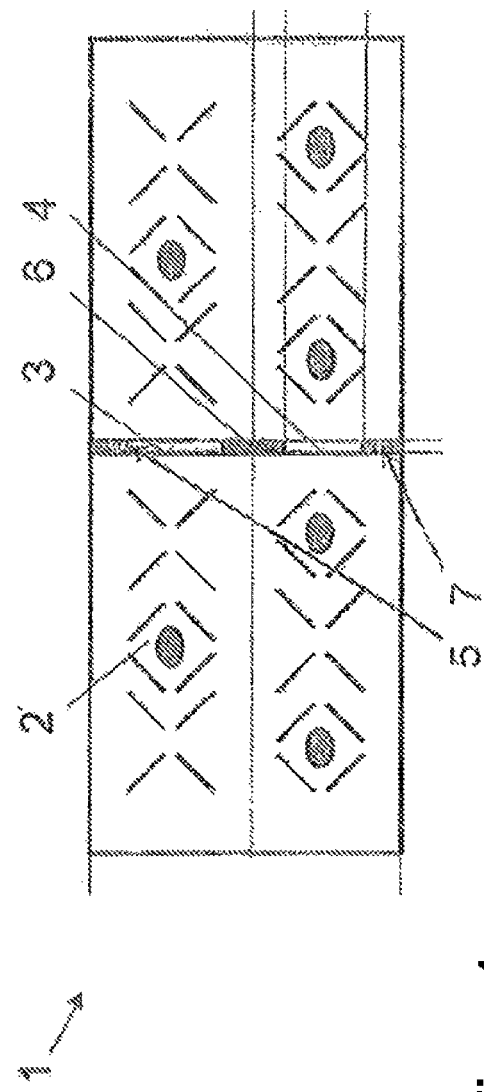

| | | |
|---|---|---|
| 4,294,011 A | 10/1981 | Kemme |
| 5,579,832 A | 12/1996 | Le Gauyer |
| 7,182,128 B2 | 2/2007 | Yu et al. |
| 2007/0277964 A1 | 12/2007 | Higashiyama et al. |

FOREIGN PATENT DOCUMENTS

| | | |
|---|---|---|
| CN | 101082470 A | 12/2007 |
| DE | 31 36 620 A1 | 3/1983 |
| DE | 197 49 281 A1 | 5/1999 |
| DE | 10 2004 057 407 A1 | 8/2005 |
| DE | 10 2005 010 493 A1 | 9/2006 |
| DE | 10 2006 011 626 A1 | 9/2006 |
| EA | 007521 B1 | 10/2006 |
| FR | 1 281 931 | 12/1961 |
| SU | 503649 A | 3/1976 |
| SU | 512868 A | 5/1976 |
| SU | 959935 A | 9/1982 |

OTHER PUBLICATIONS

German Search Report, Appl. No. 102010026280.3, Feb. 13, 2012, 4 pgs.

European Patent Office Communication under Rule 114(2) EPO, May 16, 2014, 8 pgs.

* cited by examiner

METHOD FOR PRODUCING A TUBE FOR A HEAT EXCHANGER, IN PARTICULAR FOR A MOTOR VEHICLE

CROSS-REFERENCE TO RELATED PATENT APPLICATIONS

This application is a National Stage of International Application No. PCT/EP2011/061376, filed Jul. 6, 2011, which is based upon and claims the benefit of priority from prior German Patent Application No. 10 2010 026 280.3, filed Jul. 6, 2010, the entire contents of all of which are incorporated herein by reference in their entirety.

The invention relates to a method for producing a tube for a heat exchanger, in particular for a motor vehicle, where a long tube, which is provided on a surface with turbulence inserts, is separated into at least two individual tubes.

Heat exchangers with heat transfer tubes are known in many embodiments and applications and are, in particular, also used for the engine cooling and the air conditioning of motor vehicles. Such heat exchangers have a soldered block of tubes and corrugated ribs, a coolant flowing through in the tubes. The tube is flowed around from the outside by a medium to be cooled, for example the exhaust gas of an internal combustion engine. The tube, in this case, has deep-drawn embossing, so-called winglets, by means of which the laminar flow of the medium to be cooled is converted into a turbulent flow.

Said tubes are normally produced from long tubes which are separated into individual tubes by means of a precision circular saw. In the case of said operation, however, a high number of small unwanted contaminant residues are formed or smallest particles relating to same, as the application of the sawing method is a machine-cutting separating method carried out at a high cutting speed. Such a machine-cutting separating method requires costly subsequent cleaning of the individual tubes. In addition, an additional process in the form of brush deburring is necessary, where burrs and saw flakes are removed from the cutting faces of the tube and clean cutting faces are created. Said additional cleaning processes increase the costs as well as the time spent on the production of the tube.

Consequently, the object underlying the invention is to provide a method for producing a tube for a heat exchanger, in particular for a motor vehicle, said method being cost-efficient and the production enabling essentially cleaner cutting faces at the edges of the tubes without any finishing or with only a little finishing of the tubes.

As claimed in the invention, the object is achieved in that a first part of an at least two-part cutting apparatus is introduced into the interior of the long tube through at least one opening of the long tube and the second part of the cutting apparatus is placed on the outside of the long tube approximately opposite the first part of the cutting device which is inside, and the first part and the second part of the cutting device are pressed against each other for separating the long tube. The advantage of this is that the tube is produced in an at least virtually non-cutting or minimum-cutting manner. As a result of said production being virtually non-cutting, it is possible most extensively to dispense with a cleaning of residues of the tube or it is possible to reduce the expenditure relating to same, as hardly any or no burrs and flakes arise during said production or separating method. In addition, where applicable, the additional process of brush deburring can also be omitted. By producing the tube for a heat exchanger in this manner, not only the costs for the separation of the tubes are reduced, but also the time spent on the manufacture thereof in production, as it is possible to dispense with a finishing process for the tubes.

In an advantageous manner, the at least one opening is provided in the longitudinal extension of a metal band at predetermined spacings and the metal band is then deformed to form the long tube. As the metal band is simple to handle, the necessary openings can be provided in the metal band in an automatic process. The openings are provided in the metal band precisely at the positions where, subsequently, the long tube is to be separated into individual tubes. The openings, in this case, can preferably be punched out of the metal band in a particularly simple manner. The metal band is only then deformed to form the long tube.

In one development, in each case at least two openings, which are located side by side in the cross extension of the metal band, are provided in the metal band, wherein the metal band is formed into the long tube with an, in particular, rectangular cross section in such a manner that the at least two openings are located opposite each other at a spacing on the long tube. A controlled tool can initially provide the openings on the metal band in the correct position in each case at predetermined spacings along the longitudinal extension of the metal band. Depending on the desired embodiment, the position of the openings varies as a function of the length, which is possible to realize in a simple manner by means of the controlled tool.

In a further development, the openings are realized in a slot-like manner, wherein the longitudinal extension of the slot-like openings is effected approximately at right angles with respect to the longitudinal extension of the long tube and the slot-like openings are connected together by webs. The long tube can consequently be formed into individual tubes in a particularly simple manner in particular in the region of the webs.

In one variant, the at least two-part cutting device consists of a cutting apparatus and a die, wherein either the cutting apparatus as the first part of the cutting device is introduced through two opposite openings of the long tube into the interior of same and is held there and the die as the second part of the cutting device on the outside of the long tube is placed onto said long tube, or the die as the first part of the cutting device is introduced through the two opposite openings of the long tube in the interior of same and is held there and the cutting apparatus on the outside of the long tube is placed on said long tube. Depending on the positioning of the cutting apparatus or of the die, it is possible to separate the long tube from in to out or from out to in.

In another embodiment, the cutting apparatus has at least two cutting faces which are adapted to the cross-sectional geometry of the long tube, wherein initially one cutting face is pressed against the die for separating part of the long tube and then the other cutting face is pressed against the die for separating the remaining part of the long tube, as a result of which the individual tube can be separated from the long tube. Through said method of operation, the tube can be separated in a completely automatic manner, it being possible to add said process into the cycle times in a favourable manner when the tube is being produced.

In one variant, during the insertion of the cutting apparatus into the interior of the long tube and the positioning of the cutting apparatus with respect to the cross-sectional geometry of the long tube, the die is open, said die being closed prior to the execution of the cutting operation. Consequently, there is sufficient clearance present for the cutting apparatus to be able to be positioned precisely inside the long tube.

In particular, in the closed state, the die encompasses the long tube approximately completely within its extent. Consequently, particularly secure positioning of the long tube is provided, the slipping of which during the cutting operation is securely prevented, as a result of which a cleaner cutting face at the tube is ensured.

In an advantageous manner, the cutting apparatus is held within the two opposite openings so as to be movable vertically with respect to the longitudinal extension of the long tube, wherein the cutting apparatus is moved in a first direction in the first cutting operation and is moved in the opposite second direction in the second cutting operation. As the long tube is fixedly positioned by means of the die, the movement of the cutting apparatus can bring about a cleaner cut for the separating of the tubes.

In particular, the die is opened once the first and the second cutting operation have been terminated. In this case, the cutting apparatus can be moved out of the long tube.

Figure 2:
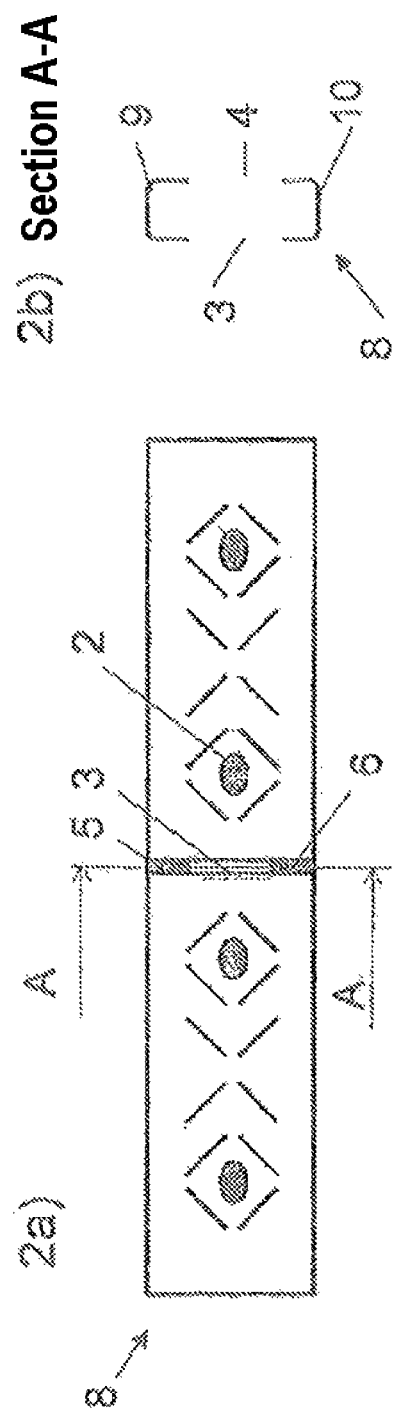
Figure 3:
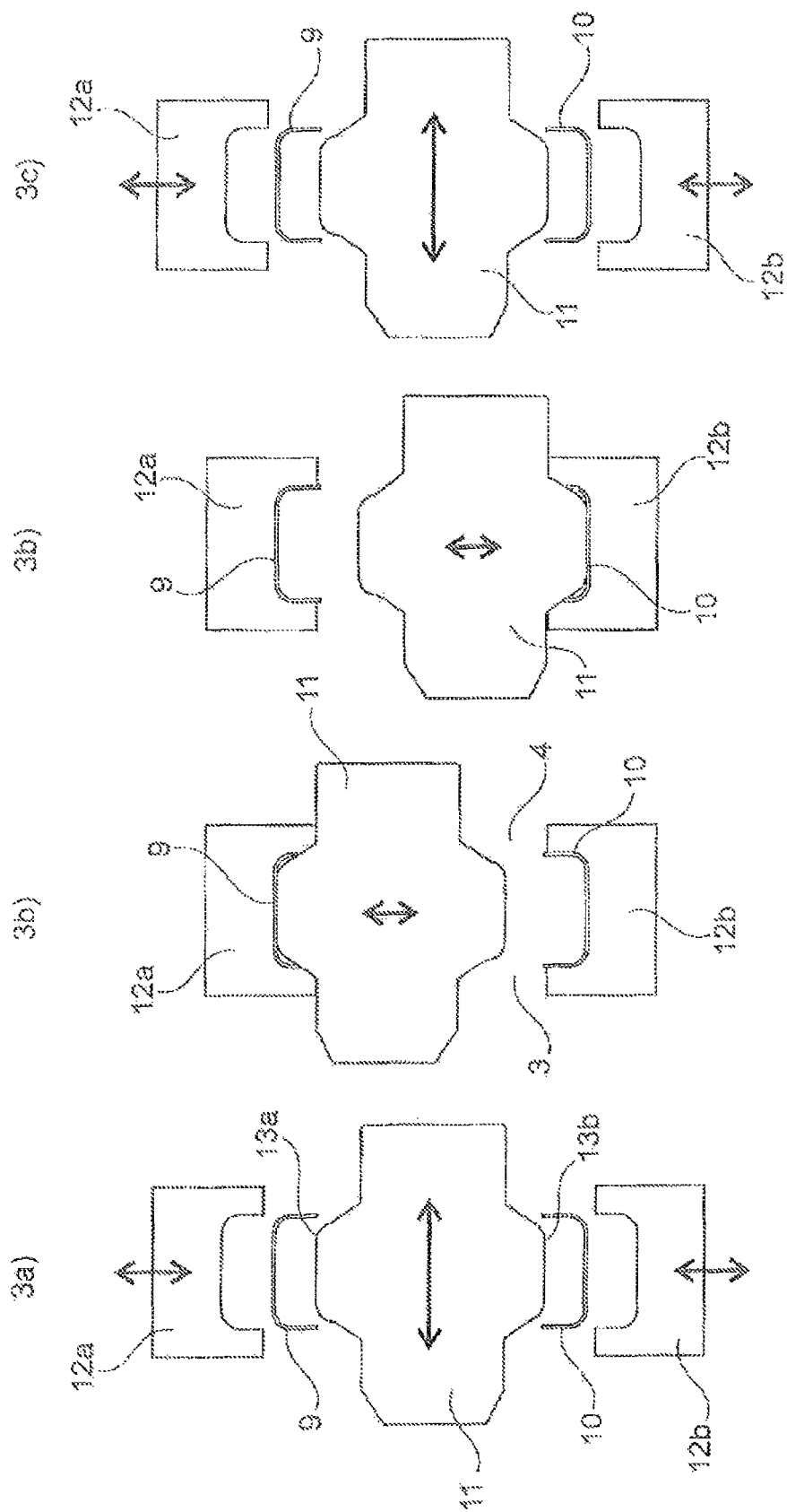

The invention allows for numerous embodiments. One of these is to be explained in more detail by way of the figures shown in the drawing, in which:

FIG. 1: shows a metal band with turbulence inserts,
FIG. 2: shows a curved tube,
FIG. 3: shows operating steps when separating a tube.

Identical features are marked with identical reference numerals.

FIG. 1 shows a metal band 1 in the form of a strip of, for example, 36 mm width. In a first method step, turbulence inserts 2, so-called winglets, are generated in the metal band 1 at regular spacings. The turbulence inserts 2, in this case, are deep-drawn by being embossed by a composite tool. Once the turbulence inserts 2 have been adjusted, slot-like openings 3 and 4 are punched into the metal band 1 in arbitrary, previously established portions. Said slot-like openings 3 and 4, which have a maximum width of 2 mm, extend, in this case, transversely with respect to the longitudinal extension of the metal band 1 and are connected together by means of webs 5, 6 and 7.

Once the slot-like openings 3 and 4 have been punched out, the metal band 1 is bent and welded in the longitudinal extension thereof such that the long tube 8 is produced. The slot-like openings 3 and 4 provided in the metal band 1 are now positioned in the long tube 8 such that the slot-like openings 3, 4 are located directly opposite one another, wherein the tube interior separates the slot-like openings 3 and 4. The long tube 8 formed in this manner is shown in FIG. 2. FIG. 2b, in this case, shows a section through the formed long tube 8 along the line A-A. The long tube 8 has a rectangular cross section, which is why it is also conventionally designated as a flat tube.

The long tube 8, finished in this manner, is now to be separated. The cutting sequence of the separating process is shown in FIG. 3. Said representation also includes the section A-A which has already been looked at in FIG. 2b. A cutting device 11, 12 is required to separate the long tube 8 into individual tubes, said cutting device being realized in two parts and consisting of a cutting device 11 and a die 12a, b, the die 12a, b being divided into a top part 12a and a bottom part 12b. In a first step, the cutting apparatus 11 is moved through the slot-like openings 3 and 4 into the interior of the long tube 8. The cutting apparatus 11, in this case, is realized as a very flat blanking punch which has a thickness of approximately 1 mm. The cutting apparatus 11 is positioned and adjusted precisely inside the long tube 8 in relation to the top part 9 or the bottom part 10 of the long tube 8, which are separated by the longitudinal slot 3, 4. The die 12a, 12b is open during said method step.

In a further step, the die 12a or 12b is now closed, as shown in FIG. 3b. This means that the die part 12a surrounds the top part 9 of the long tube 8 in a fixed manner, whilst the die part 12b encompasses the bottom part 10 of the long tube 8 in a fixed manner. As can be seen from FIG. 3b, the cutting apparatus 11 has two cutting faces 13a and 13b. The cutting face 13a, in this case, is directed against the top part 9 of the long tube 8, whilst the cutting face 13b points to the bottom part 10 of the long tube 8. The cutting apparatus 11 is initially pressed against the top part 9 of the long tube 8, the die 12a locking the long tube 8 in its position such that the cutting operation is able to be carried out without any further problems. Once the cut has been made on the top part 9 of the long tube 8, the cutting apparatus 11 moves in the opposite direction and cuts the bottom part 10 of the long tube 8, which is held by the die part 12b. The slot-like openings 3 and 4 are realized in their extension such that the cutting apparatus 11 is able to move in said two directions without any problems.

By means of said cutting apparatus 11, which is mounted on both sides in the slot-like openings 3, 4, the long tube 8 is initially separated in one and then in the other direction, the top part 9 and the bottom part 10 of the long tube 8 being separated at the position where the slot-like openings 3, 4 extend. Once the cutting operation is concluded, the die 12a, 12b is opened and the cutting apparatus 11 is moved out of the long tube 8.

During the production of a tube for a heat exchanger, the production costs are reduced and a particular cleanliness of the cutting faces is ensured by means of said method of operation, as the method described is a non-cutting method. Additional operating steps, such as washing the tubes or a costly brush deburring process, which are necessary in the case of a machine-cutting separating method, are able to be omitted in the case of the proposed solution. Once the cycle time has been optimized, the described production of the tube can be embedded into an automatic production process.

The invention claimed is:

1. A method for producing a tube for a heat exchanger, in particular for a motor vehicle, comprising:
    providing on the surface of the long tube turbulence inserts,
    subsequent to providing the turbulence inserts, providing at least one opening in a longitudinal extension of a metal band at predetermined spacing, wherein the metal band is deformed to form a long tube,
    wherein a first part of an at least two-part cutting device is introduced into the interior of the long tube through at least one opening of the long tube and the second part of the cutting device is placed on the outside of the long tube approximately opposite the first part of the cutting device which is inside, and the first part and the second part of the cutting device are pressed against each other, and
    separating the long tube into at least two tubes.

2. The method as claimed in claim 1, wherein in each case at least two openings, which are located side by side in the cross extension of the metal band, are provided in the metal band, wherein the metal band is formed into the long tube with a rectangular cross section in such a manner that the at least two openings are located opposite each other at a spacing on the long tube.

3. The method as claimed in claim 2, wherein the at least two openings are in a slot-like manner, wherein the longitudinal extension of the at least two openings are approximately at right angles with respect to the longitudinal extension of the long tube and the at least two openings are connected together by webs.

4. The method as claimed in claim 1, wherein the at least two-part cutting device consists of a cutting apparatus and a die,
   wherein either the cutting apparatus as the first part of the cutting device is introduced through at least two openings of the long tube and is held there and the die as the second part of the cutting device on the outside of the long tube is placed onto said long tube, or
   the die as the first part of the cutting device is introduced through the at least two openings of the long tube and is held there and the cutting apparatus on the outside of the long tube is placed onto said long tube.

5. The method as claimed in claim 4, wherein the cutting apparatus has at least two cutting faces which are adapted to the cross-sectional geometry of the long tube, wherein initially one cutting face is pressed against the die for separating part of the long tube and then the other cutting face is pressed against the die for separating the remaining part of the long tube, as a result of which the tube is separated from the long tube.

6. The method as claimed in claim 5, wherein the cutting apparatus is held within the at least two openings so as to be movable vertically with respect to the longitudinal extension of the long tube, wherein the cutting apparatus is moved in a first direction in the first cutting operation and is moved in the opposite second direction in the second cutting operation.

7. The method as claimed in claim 6, wherein the die is opened once the first and the second cutting operations have been terminated.

8. The method as claimed in claim 4, wherein during the insertion of the cutting apparatus into the interior of the long tube and the positioning of the cutting apparatus with respect to the cross-sectional geometry of the long tube, the die is open, said die being closed prior to the execution of the cutting operation.

9. The method as claimed in claim 8, wherein the die in the closed state encompasses the long tube approximately completely within its extent.

* * * * *